United States Patent [19]
Shintani et al.

[11] Patent Number: 5,978,056
[45] Date of Patent: *Nov. 2, 1999

[54] REFLECTION-TYPE DISPLAY APPARATUS HAVING ANTIREFLECTION FILMS

[75] Inventors: Masaki Shintani, Kamakura; Masanobu Shigeta, Yokosuka; Toshihiko Nishihata, Yokohama; Hideo Kurogane, Zushi; Akira Honma, Ebina, all of Japan

[73] Assignee: Victor Company of Japan, Ltd, Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/730,241

[22] Filed: Oct. 15, 1996

[30] Foreign Application Priority Data

Oct. 15, 1995 [JP] Japan ................................ 7-293637

[51] Int. Cl.⁶ .................... G02F 1/1333; G02F 1/1335
[52] U.S. Cl. ...................... 349/137; 349/44; 349/138; 349/111
[58] Field of Search ............................ 349/44, 113, 137, 349/138, 111

[56] References Cited

U.S. PATENT DOCUMENTS

| | | | |
|---|---|---|---|
| 4,556,288 | 12/1985 | Sekimura | 349/137 |
| 4,572,615 | 2/1986 | Nickol et al. | 349/137 |
| 4,895,432 | 1/1990 | Iswashit et al. | 349/137 |
| 4,961,625 | 10/1990 | Wood et al. | 350/174 |

(List continued on next page.)

FOREIGN PATENT DOCUMENTS

| | | |
|---|---|---|
| 0112417 | 7/1984 | European Pat. Off. |
| 0740188 | 10/1996 | European Pat. Off. |

(List continued on next page.)

OTHER PUBLICATIONS

"Basis of Macroscopic and Microscopic Surface Shaping and Smoothing by Plasma Assisted Chemical Etching" by C.B. Zarowin; J. Vac. Sci. Technol. B 12(6), Nov./Dec. 1994; pp., 3356–3362.

*Primary Examiner*—William L. Sikes
*Assistant Examiner*—Toan Ton
*Attorney, Agent, or Firm*—Pollock, Vande Sande & Amernick

[57] ABSTRACT

An active circuit element substrate is provided with a matrix array of active circuit elements. Each of the active circuit elements includes 1) a switching element, 2) a capacitor, 3) an electrically-conductive portion connecting the switching element and the capacitor, 4) an insulating layer covering the switching element, the capacitor, and the electrically-conductive portion, and 5) a reflective electrode layer connected to the electrically-conductive portion and extending on the insulating layer. The insulating layer has a surface flat so as to agree with a mirror finished surface. The reflective electrode layer extends on the surface of the insulating layer. A transparent common electrode film extends on a surface of a transparent substrate. An optical modulation layer is located between the reflective electrode layers on the active circuit element substrate and the common electrode film on the transparent substrate. A voltage difference is generated between each of the reflective electrode layers and the common electrode film in response to a signal applied to a control terminal of the related switching element, and light incident to the transparent substrate is modulated by the optical modulation layer in response to the voltage difference and is reflected by the related reflective electrode layer. A light shielding layer covers regions between the reflective electrode layers except portions occupied by metal areas of the active circuit elements as viewed along a direction of incidence of the light. The light shielding layer extends in the insulating layer.

15 Claims, 10 Drawing Sheets

U.S. PATENT DOCUMENTS

| | | | |
|---|---|---|---|
| 4,980,310 | 12/1990 | Matsuda et al. | 437/52 |
| 5,327,001 | 7/1994 | Wakai et al. | 349/42 |
| 5,481,490 | 1/1996 | Watanabe et al. | 365/145 |
| 5,500,077 | 3/1996 | Nishibayashi et al. | 216/38 |
| 5,754,261 | 5/1998 | Lyu | 349/44 |
| 5,781,254 | 7/1998 | Kim et al. | 349/44 |
| 5,784,132 | 7/1998 | Hashimoto | 349/44 |

FOREIGN PATENT DOCUMENTS

| | | | |
|---|---|---|---|
| 57-039422 | 8/1982 | Japan. | |
| 61-043712 | 9/1986 | Japan. | |
| 1035351 | 7/1989 | Japan. | |
| 1-297623 | 11/1989 | Japan | 349/137 |
| 3288474 | 12/1991 | Japan. | |
| 4034313 | 6/1992 | Japan. | |
| 4051070 | 8/1992 | Japan. | |
| 4338721 | 11/1992 | Japan. | |
| 5241199 | 9/1993 | Japan. | |
| 9420880 | 9/1994 | WIPO. | |

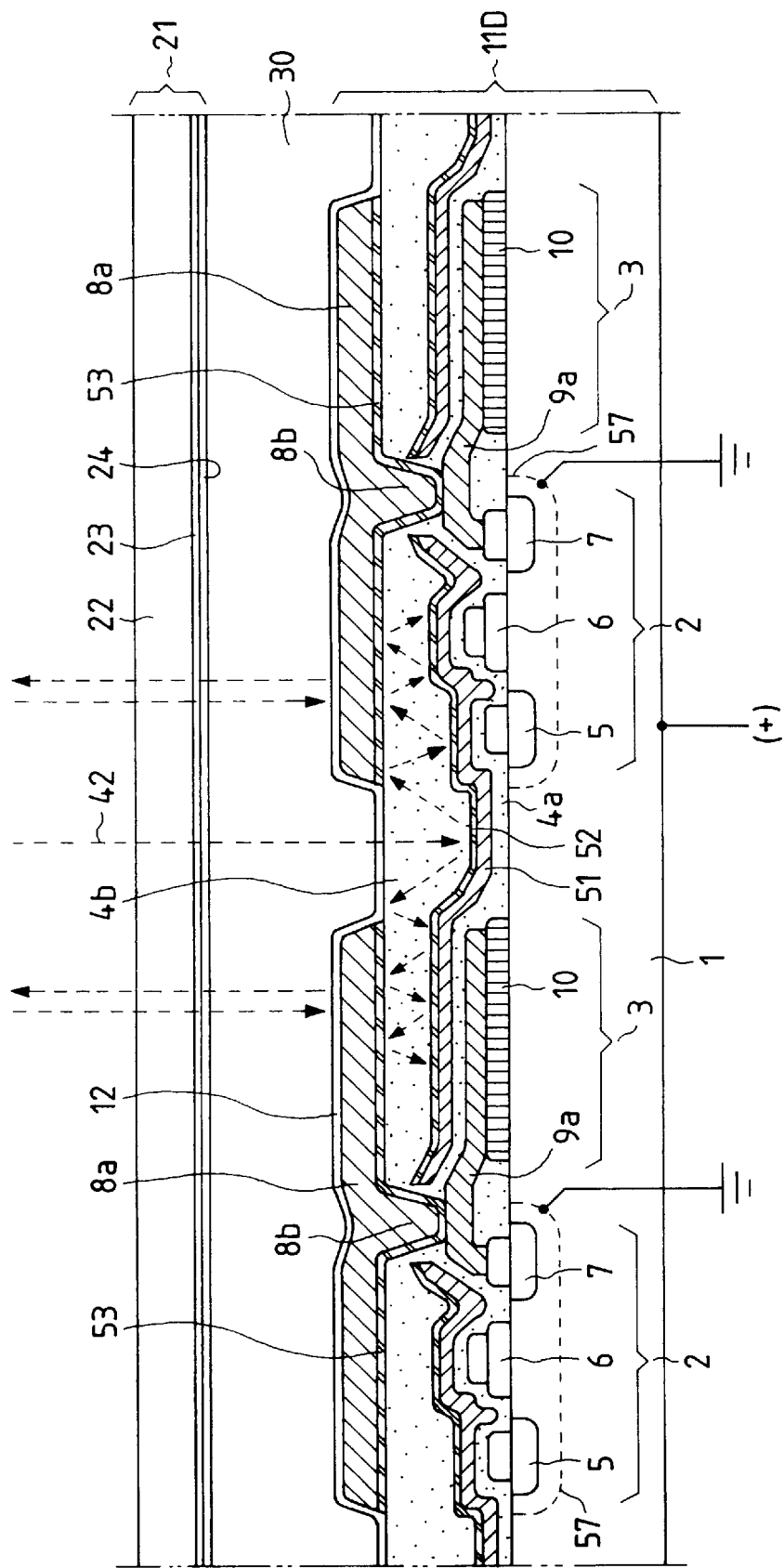

REFLECTION-TYPE DISPLAY APPARATUS HAVING ANTIREFLECTION FILMS

BACKGROUND OF THE INVENTION

1. Field of the Invention

This invention relates to a reflection-type display apparatus.

2. Description of the Prior Art

Generally, projection-type display systems indicate pictures on large screens. Some of projection-type display systems use transmission liquid-crystal display panels or reflection liquid-crystal display panels.

In the case of a reflection liquid-crystal display panel, the reflectivity of the panel determines the coefficient of utilization of light. A higher reflectivity of the panel is desirable.

SUMMARY OF THE INVENTION

It is an object of this invention to provide an improved reflection-type display apparatus.

A first aspect of this invention provides a reflection-type display apparatus comprising an active circuit element substrate; a matrix array of active circuit elements provided on the active circuit element substrate and each corresponding to one pixel, wherein each of the active circuit elements includes 1) a switching element, 2) a capacitor, 3) an electrically-conductive portion connecting the switching element and the capacitor, 4) an insulating layer covering the switching element, the capacitor, and the electrically-conductive portion, and 5) a reflective electrode layer connected to the electrically-conductive portion and extending on the insulating layer, and wherein the insulating layer having a surface which is flat so as to be in agreement with a mirror finished surface, and the reflective electrode layer extends on the surface of the insulating layer; a transparent substrate; a transparent common electrode film extending on a surface of the transparent substrate; an optical modulation layer located between the reflective electrode layers on the active circuit element substrate and the common electrode film on the transparent substrate; wherein a voltage difference is generated between each of the reflective electrode layers and the common electrode film in response to a signal applied to a control terminal of the related switching element, and light incident to the transparent substrate is modulated by the optical modulation layer in response to the voltage difference and is reflected by the related reflective electrode layer; and a light shielding layer covering regions between the reflective electrode layers except portions occupied by metal areas of the active circuit elements as viewed along a direction of incidence of the light, the light shielding layer extending in the insulating layer.

A second aspect of this invention is based on the first aspect thereof, and provides a reflection-type display apparatus wherein each of the reflective electrode layers is made of a metal selected from the group consisting of aluminum, aluminum-based material containing silicon, and aluminum-based material containing copper.

A third aspect of this invention is based on the first aspect thereof, and provides a reflection-type display apparatus further comprising antireflection films extending on surfaces of the reflective electrode layers which face the light shielding layer, and an antireflection film extending on a surface of the light shielding layer which faces the reflective electrode layers.

A fourth aspect of this invention is based on the first aspect thereof, and provides a reflection-type display apparatus further comprising an antireflection film extending on a surface of the light shielding layer which faces the metal areas of the active circuit elements, and antireflection films extending on surfaces of the metal areas of the active circuit elements which face the light shielding layer.

A fifth aspect of this invention is based on the first aspect thereof, and provides a reflection-type display apparatus further comprising a reflection enhancement layer extending on the reflective electrode layers, the reflection enhancement layer including a laminate of dielectric films.

A sixth aspect of this invention is based on the fifth aspect thereof, and provides a reflection-type display apparatus wherein the reflection enhancement layer includes an alternation of silicon oxide films and titanium oxide films.

A seventh aspect of this invention is based on the first aspect thereof, and provides a reflection-type display apparatus further comprising insulating portions filling the regions between the reflective electrode layers, the insulating portions having surfaces which are flat so as to be in agreement with mirror finished surfaces.

An eighth aspect of this invention is based on the first aspect thereof, and provides a reflection-type display apparatus wherein the switching elements include transistors respectively, and further comprising separating regions located between the active circuit elements, the separating regions having a conductivity type equal to a conductivity type of output electrodes of the transistors.

A ninth aspect of this invention is based on the first aspect thereof, and provides a reflection-type display apparatus wherein the active circuit element substrate includes a semiconductor substrate, and the switching elements include transistors on the semiconductor substrate respectively, the semiconductor substrate having wells separate from each other, the wells having a conductivity type opposite to a conductivity type of output electrodes of the transistors, the transistors being provided in the wells respectively.

A tenth aspect of this invention is based on the first aspect thereof, and provides a reflection-type display apparatus wherein the light shielding layer includes a plurality of separate layers.

An eleventh aspect of this invention provides a reflection-type display apparatus comprising a semiconductor substrate; an insulating layer provided on the semiconductor substrate and having a mirror finished surface; first and second reflective electrode layers provided on the mirror finished surface of the insulating layer and being separate from each other; and a light shielding layer provided on the semiconductor substrate and covering a region between the first and second reflective electrode layers to prevent light from entering the semiconductor substrate via the region between the first and second reflective electrode layers.

A twelfth aspect of this invention is based on the eleventh aspect thereof, and provides a reflection-type display apparatus further comprising an antireflection film provided on the light shielding layer.

A thirteenth aspect of this invention is based on the eleventh aspect thereof, and provides a reflection-type display apparatus further comprising antireflection films provided on surfaces of the first and second reflective electrode layers which face the light shielding layer.

A fourteenth aspect of this invention is based on the eleventh aspect thereof, and provides a reflection-type display apparatus further comprising a reflection enhancement layer extending on the first and second reflective electrode layers.

A fifteenth aspect of this invention is based on the eleventh aspect thereof, and provides a reflection-type display apparatus further comprising an insulating portion provided on the semiconductor substrate and being located at the region between the first and second reflective electrode layers, the insulating portion having a mirror finished surface.

A sixteenth aspect of this invention is based on the eleventh aspect thereof, and provides a reflection-type display apparatus further comprising a first transistor provided on the semiconductor substrate and being connected to the first reflective electrode layer, the first transistor forming a first cell in conjunction with the first reflective electrode layer, a second transistor provided on the semiconductor substrate and being connected to the second reflective electrode layer, the second transistor forming a second cell in conjunction with the second reflective electrode layer, and a separating region provided in the semiconductor substrate and being located between the first and second cells, the separating region having a conductivity type equal to a conductivity type of output electrodes of the first and second transistors.

A seventeenth aspect of this invention is based on the eleventh aspect thereof, and provides a reflection-type display apparatus further comprising transistors provided on the semiconductor substrate and being connected to the first and second reflective electrode layers respectively, the semiconductor substrate having wells separate from each other, the wells having a conductivity type opposite to a conductivity type of output electrodes of the transistors, the transistors being provided in the wells respectively.

BRIEF DESCRIPTION OF THE DRAWINGS

FIG. 20 is a sectional view of a 2-pixel-corresponding portion of a reflection-type display apparatus according to a fifth embodiment of this invention.

DESCRIPTION OF THE PREFERRED EMBODIMENTS

A prior-art reflection-type display apparatus will be explained for a better understanding of this invention.

Figure 1:
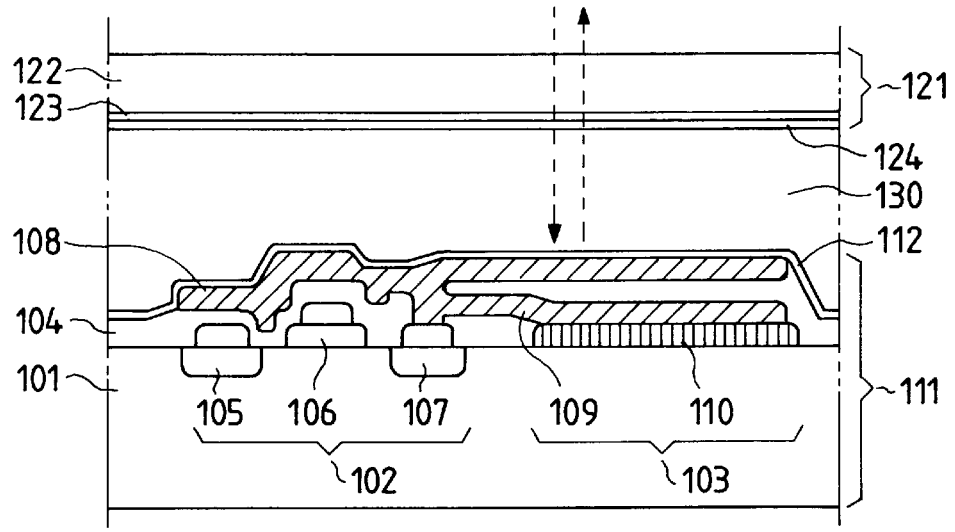
FIG. 1 is a sectional view of a 1-pixel-corresponding portion of a prior-art reflection-type display apparatus.

With reference to FIG. 1, a prior-art reflection-type display apparatus includes an Si (silicon) substrate 101. A MOS-FET 102 and a capacitor 103 are formed on the Si substrate 101 by semiconductor-device fabricating processes. An insulating layer 104 extends on the Si substrate 101. The MOS-FET 102 has a drain 105, a gate 106, and a source 107.

In the prior-art reflection-type display apparatus of FIG. 1, a reflective electrode layer 108 made of aluminum (Al) extends on the insulating layer 104. A lower portion of the reflective electrode layer 108 is connected to the source 107 of the MOS-FET 102. An electrically-conductive portion 109 extends horizontally from the reflective electrode layer 108 near the connection with the source 107 of the MOS-FET 102. The electrically-conductive portion 109 has a shape of a plate. An insulating film 110 made of silicon dioxide (SiO2) is sandwiched between the electrically-conductive portion 109 and the Si substrate 101. The Si substrate 101, the insulating film 110, and the electrically-conductive portion 109 compose the capacitor 103 which is electrically connected to the source 107 of the MOS-FET 102.

The MOS-FET 102 serves as a switching element. The MOS-FET 102 and the capacitor 103 compose an active circuit element which corresponds to one. pixel, and which is formed on the Si substrate 101. The MOS-FET 102, the capacitor 103, and the Si substrate 101 form an active circuit element substrate 111.

The prior-art reflection-type display apparatus of FIG. 1 includes a transparent substrate 121 composed of a glass substrate 122 and a transparent common electrode film 123. The common electrode film 123 extends on a lower surface of the glass substrate 122.

An orientation film 112 covers upper surfaces of the reflective electrode layer 108, and upper surfaces of the insulating layer 104 which are uncovered from the reflective electrode layer 108. An orientation film 124 covers a lower surface of the common electrode film 123. A liquid-crystal layer 130 is fluid-tightly held between the orientation films 112 and 124.

FIG. 1 shows only one cell of the prior-art reflection-type display apparatus. Here, one cell means a 1-pixel-corresponding portion of the prior-art reflection-type display apparatus. The prior-art reflection-type display apparatus has a matrix array of cells (1-pixel-corresponding portions) each similar to that shown in FIG. 1.

Figure 2:
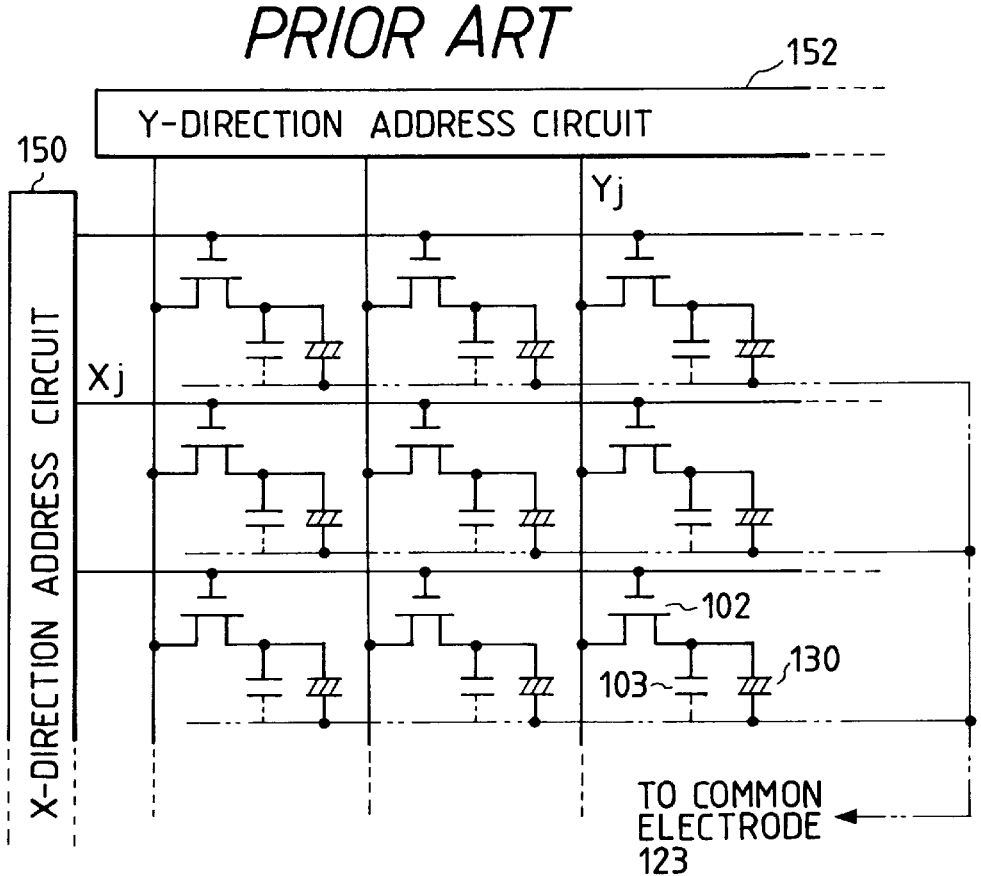
FIG. 2 is a diagram of the prior-art reflection-type display apparatus.

As shown in FIG. 2, the prior-art reflection-type display apparatus includes an X-direction address circuit 150 and a Y-direction address circuit 152. The X-direction address circuit 150 serves to output selection signals. The Y-direction address circuit 152 serves to output picture signals (video information signals). A given number of gate lines Xj extend from the X-direction address circuit 150, where j=1, 2, J. The gate lines Xj are assigned to rows of the MOS-FET's 102, respectively. Each of the gate lines Xj is connected to the gates 106 of the MOS-FET's 102 in a corresponding row. A given number of signal lines Yj extend from the Y-direction address circuit 152, where j=1, 2, J. The signal lines Yj are assigned to columns of the MOS-FET's 102, respectively. Each of the signal lines Yj is connected to the drains 105 of the MOS-FET's 102 in a corresponding column.

In the prior-art reflection-type display apparatus of FIGS. 1 and 2, the source of each MOS-FET 102 is connected to one end of a related capacitor 103. The other end of the capacitor 103 is connected to the common electrode film 123. A capacitor including a 1-pixel-corresponding portion of the liquid-crystal layer 130 is connected in parallel with the capacitor 103.

The prior-art reflection-type display apparatus of FIGS. 1 and 2 operates as follows. Forward light enters the liquid crystal layer 130 via the glass substrate 122, the common electrode film 123, and the orientation film 124. The forward light advances in the liquid crystal layer 130, and then reaches the reflective electrode layer 108. The forward light is reflected by the reflective electrode layer 108 so that the forward light changes into return light. The return light moves back through the liquid crystal layer 130, and then passes through the orientation film 124, the common electrode film 123, and the glass substrate 122.

When an active selection signal is applied to the gate 106 of a MOS-FET 102 from the X-direction address circuit 150 via a gate line Xj, the MOS-FET 102 falls into an ON state (a conductive state). In this case, a picture signal travels from the Y-direction address circuit 152 to the source 107 of the ON-state MOS-FET 102 via a signal line Yj and the drain-source path of the ON-state MOS-FET 102. Then, the picture signal travels to a reflective electrode layer 108 and an electrically-conductive portion 109 connected to the ON-state MOS-FET 102. Accordingly, a signal voltage corresponding to the picture signal is applied to a 1-pixel-corresponding area of the liquid crystal layer 130 between the reflective electrode layer 108 and the common electrode film 123. In addition, the picture signal charges a capacitor 103 connected to the ON-state MOS-FET 102. Thus, a signal voltage corresponding to the picture signal occurs across the capacitor 103. In other words, the picture signal is written into the capacitor 103. After the active selection signal is replaced by an inactive selection signal, the capacitor 103 serves to maintain the application of the signal voltage to the 1-pixel-corresponding area of the liquid crystal layer 130 for a given time interval. The given time interval depends on the time constant determined by the capacitance of the capacitor 103 and the resistance to the discharging of the capacitor 103. The optical property or the transmittance of the 1-pixel-corresponding area of the liquid crystal layer 130 changes in response to the signal voltage applied thereto. Accordingly, the light which travels in the 1-pixel-corresponding area of the liquid crystal layer 130 is modulated in response to the signal voltage. Thus, a 1-pixel-corresponding portion of the return light outputted from the glass substrate 122 is modulated in response to the signal voltage.

An active selection signal is sequentially applied to rows of the MOS-FET's 102 to implement a vertical scanning process. During the application of an active selection signal to one row, picture signals are sequentially applied to the MOS-FET's 102 in the row respectively to implement a horizontal scanning process.

In the prior-art reflection-type display apparatus of FIGS. 1 and 2, the MOS-FET 102 on the Si substrate 101 causes roughnesses in the insulating layer 104 and the reflective electrode layer 108. Uneven or stepped upper surfaces of the reflective electrode layer 108 decrease the reflectivity thereof. The decreased reflectivity causes a reduced brightness of a picture represented by the return light outputted from the display apparatus.

Figure 3:
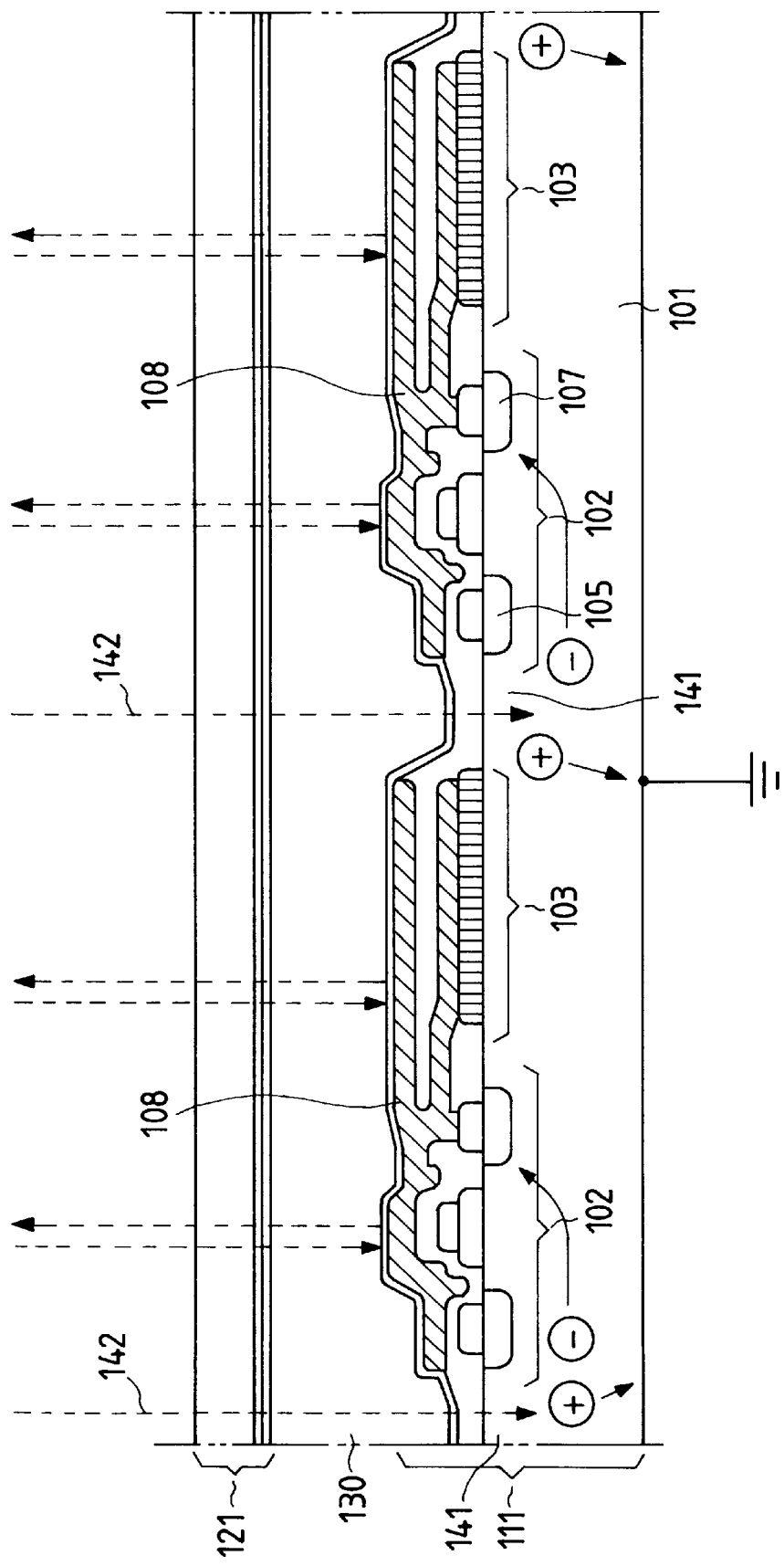
FIG. 3 is a sectional view of a 2-pixel-corresponding portion of the prior-art reflection-type display apparatus.

FIG. 3 shows two cells of the prior-art reflection-type display apparatus. In the prior-art reflection-type display apparatus of FIGS. 1, 2, and 3, when the intensity of the forward light is increased to a certain level or higher to raise the displayed picture brightness, the forward light (denoted by the reference numeral 142 in FIG. 3) tends to enter regions 141 in the Si substrate 101 between the cells and to cause photoconductions (the generation of carriers) in the Si substrate 101. In some cases, the photoconductions cause wrong operation of the MOS-MET's 102, and hence the potentials at the reflective electrode layers 108 drop to unacceptable levels. These potential drops result in a decrease in the quality of a displayed picture.

The following conditions are considered. The conductivity of the Si substrate 101 is of the P type. The drain 105 and the source 107 of each of the MOS-FET's 102 are made of N-type diffusion layers. The Si substrate 101 is subjected to a ground potential. Under these conditions, the reflective electrode layers 108 are subjected to positive potentials depending on related picture signals. When the forward light enters the regions 141 in the Si substrate 101 between the cells, pairs of electrons and holes are generated therein. As shown in FIG. 3, the holes are absorbed by a ground side while the electrons reach the drains 105 or the sources 107 of the MOS-FET's 102. Accordingly, there occur drops in the positive potentials at the reflective electrode layers 108.

First Embodiment

Figure 4:
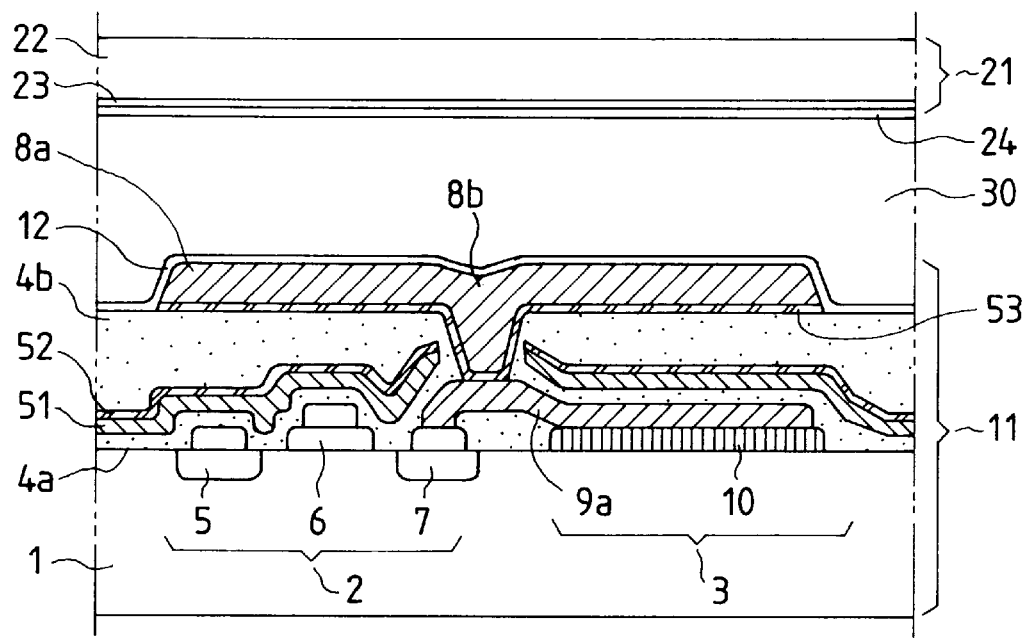
FIG. 4 is a sectional view of a 1-pixel-corresponding portion of a reflection-type display apparatus according to a first embodiment of this invention.

With reference to FIG. 4, a reflection-type display apparatus includes an Si (silicon) substrate 1. A MOS-FET 2 and a capacitor 3 are formed on the Si substrate 1 by semiconductor-device fabricating processes. The MOS-FET 2 has a drain 5, a gate 6, and a source 7.

An insulating layer 4a is formed on the Si substrate 1. The insulating layer 4a covers the drain 5 and the gate 6 of the MOS-FET 2. The insulating layer 4-a also covers a part of the source 7 of the MOS-FET 2. A light shielding layer 51 made of aluminum (Al) extends on the insulating layer 4a. An antireflection film 52 made of titanium nitride (TiN) extends on the light shielding layer 51. An insulating layer 4b extends on the antireflection film 52. The light shielding layer 51 and the antireflection film 52 are formed in an insulating region composed of th-e insulating layers 4a and 4b.

An electrically-conductive portion 9a extends from the source 7 of the MOS-FET 2. The electrically-conductive portion 9a has a horizontally-extending plate located outward of the MOS-FET 2. Upper surfaces of the plate of the electrically-conductive portion 9a are coated by a part of the insulating layer 4a. An insulating film 10 made of silicon dioxide (SiO2) is sandwiched between the Si substrate 1 and the plate of the electrically-conductive portion 9a. The Si substrate 1, the insulating film 10, and the electrically-conductive portion 9a compose the capacitor 103 which is electrically connected to the source 7 of the MOS-FET 2.

Upper surfaces of the insulating layer 4b are flat so as to be in agreement with mirror finished surfaces. A reflective electrode layer 8a is formed on the insulating layer 4b. The reflective electrode layer 8a is made of, for example, aluminum (Al). Alternatively, the reflective electrode layer 8a may be made of Al-based material containing a given small amount of silicon (Si) or copper (Cu). The reflective electrode layer 8a has a columnar projection 8b extending vertically toward the electrically-conductive portion 9a. The insulating region composed of the insulating layers 4a and 4b has a recess into which the projection 8b of the reflective electrode layer 8a extends. A bottom of the recess in the insulating region is defined by the electrically-conductive portion 9a. An antireflection film 53 made of titanium nitride (TiN) is provided in an interface or a boundary between the reflective electrode layer 8a and the insulating layer 4b, and in an interface or a boundary between the reflective electrode layer 8a (the projection 8b) and the electrically-conductive portion 9a. The electrically-conductive portion 9a is not integral with the reflective electrode layer 8a. The electrically-conductive portion 9a is electrically connected to the projection 8b of the reflective electrode layer 8a via the antireflection film 53.

The light shielding layer 51 and the antireflection film 52 have aligned openings through which the projection 8b of the reflective electrode layer 8a extends. There is a space or a clearance between sides of the projection 8b of the reflective electrode layer 8a and edges of the light shielding layer 51 and the antireflection film 52. This space (clearance) is occupied by insulating material forming a part of the insulating layer 4a or 4b. The light shielding layer 51 and the antireflection film 52 cover or conceal the MOS-FET 2 and the capacitor 3 as viewed along a downward vertical direction.

The MOS-FET 2 serves as a switching element. The MOS-FET 2 and the capacitor 3 compose an active circuit element which corresponds to one pixel, and which is formed on the Si substrate 1. The MOS-FET 2, the capacitor 3, and the Si substrate 1 form an active circuit element substrate 11.

The reflection-type display apparatus of FIG. 4 includes a transparent substrate 21 composed of a glass substrate 22 and a transparent common electrode film 23. The common electrode film 23 extends on a lower surface of the glass substrate 22.

An orientation film 12 covers upper surfaces and side surfaces of the reflective electrode layer 8a. The orientation film 12 also covers upper surfaces of the insulating layer 4b which are uncovered from the reflective electrode layer 8a. An orientation film 24 covers a lower surface of the common electrode film 23. A liquid-crystal layer 30 is fluid-tightly held between the orientation films 12 and 24.

FIG. 4 shows only one cell of the reflection-type display apparatus. Here, one cell means a 1-pixel-corresponding portion of the reflection-type display apparatus. The reflection-type display apparatus has a matrix array of cells (1-pixel-corresponding portions) each similar to that shown in FIG. 4. The light shielding layer 51 and the antireflection film 52 extend through boundary regions among the cells or boundary regions among the reflective electrode layers 8a.

Figure 5:
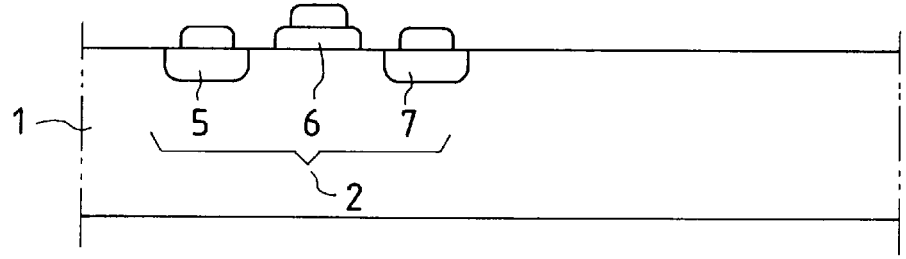
FIGS. 5, 6, 7, 8, 9, 10, 11, and 12 are sectional views of a substrate and various regions thereon which occur at different stages in the fabrication of the reflection-type display apparatus of FIG. 4.

The reflection-type display apparatus of FIG. 4 was fabricated as follows. With reference to FIG. 5, a substrate 1 made of a single crystal of P-type silicon (Si) was prepared. An N-channel MOS-FET 2 was formed on the Si substrate 1 by normal semiconductor-device fabrication processes including a step of ion implantation, a step of forming a gate oxide firm, and a step of forming electrodes. Thus, a drain 5, a gate 6, and a source 7 of the MOS-FET 2 were formed.

Figure 6:
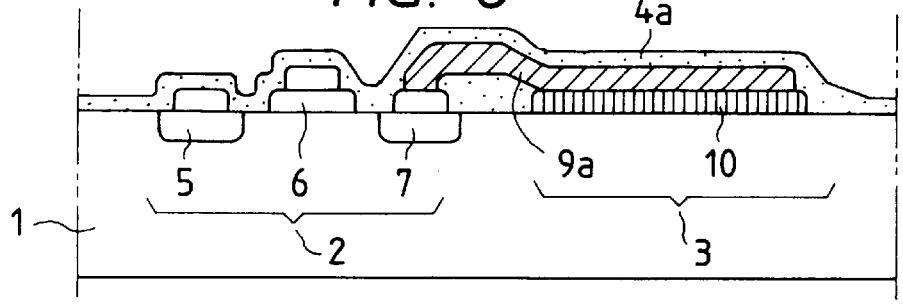

As shown in FIG. 6, an insulating film 10 made of silicon dioxide ($SiO_2$) was formed on an area of the Si substrate 1 near the source 7 of the MOS-FET 2. An electrically-conductive portion 9a was formed on the insulating film 10. The electrically-conductive portion 9a extended to the source 7 of the MOS-FET 2, and was connected thereto. Thus, a capacitor 3 including the electrically-conductive portion 9a and the insulating film 10 was formed. The MOS-FET 2 and the capacitor 3 were covered with an insulating layer 4a made by a CVD (chemical vapor deposition) process. The insulating layer 4a also extended on exposed upper surfaces of the Si substrate 1.

Figure 7:
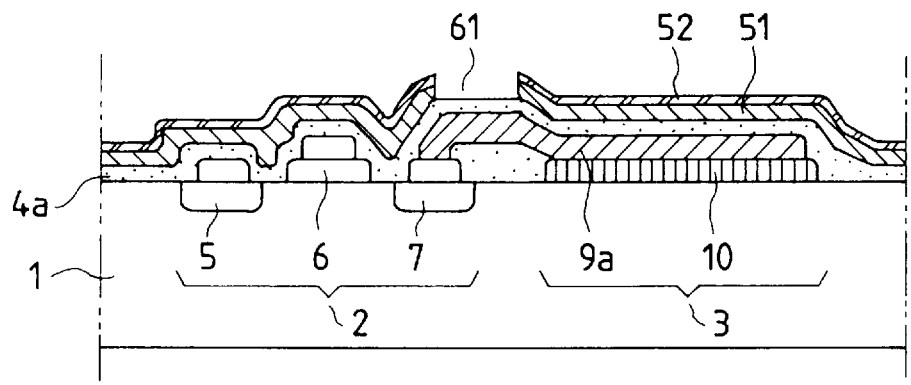

With reference to FIG. 7, a film of aluminum (Al) was formed on upper surfaces of the insulating layer 4a by a sputtering process. The aluminum film had a thickness of 3,000 Å. A film of titanium nitride (TiN) was superposed on the aluminum film by a sputtering process. The titanium nitride film had a thickness of 1,000 Å. Given aligning portions of the aluminum film and the titanium nitride film were removed by a suitable process (for example, an etching process or a sputtering process) to provide a recess 61. The resultant aluminum film formed a light shielding layer 51. The resultant titanium nitride film formed an antireflection film 52. The insulating layer 4a was exposed at a bottom of the recess 61.

Figure 8:
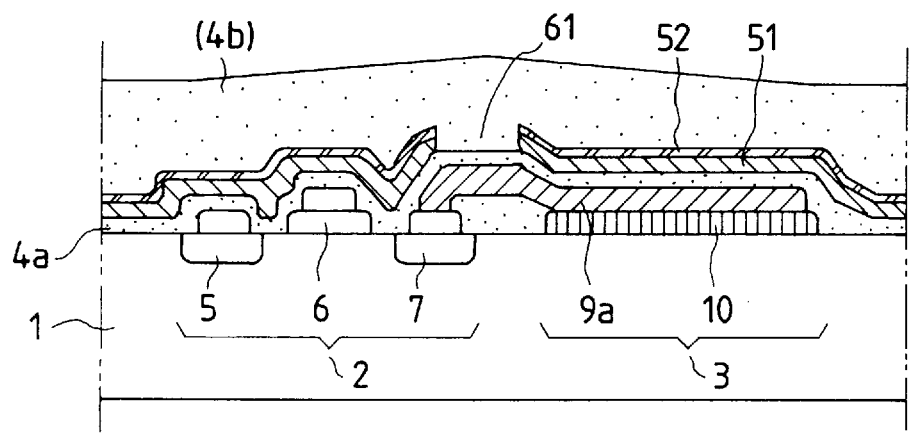

As shown in FIG. 8, the antireflection film 52 and the exposed insulating layer 4a were covered by an insulating layer 4b having a thickness of about 2 μm. The recess 61 was filled with a portion of the insulating layer 4b. The insulating layer 4b was made of applied-type material such as SOG.

Figure 9:
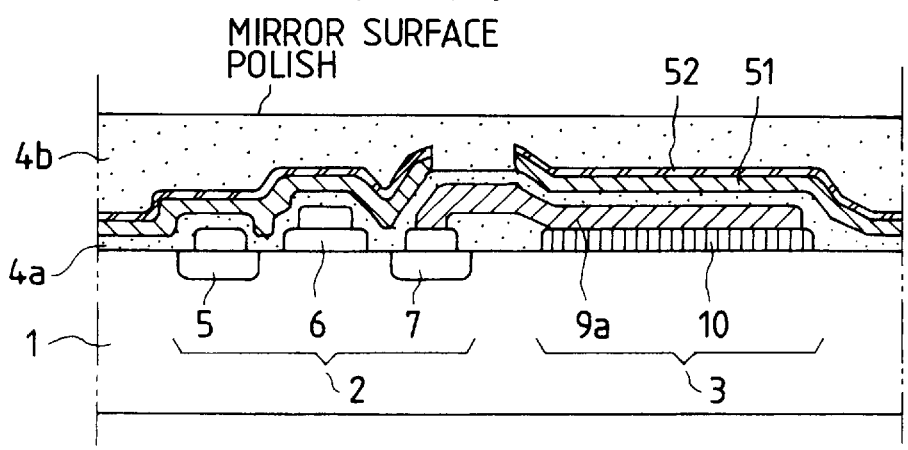

With reference to FIG. 9, upper surfaces of the insulating layer 4b were polished by a CMP (chemical mechanical polish) process into mirror finished surfaces. The resultant upper surfaces of the insulating layer 4b had a degree of flatness which corresponded to 5 Å or less in central mean roughness. The CMP process may be replaced by a mechanical polish process using particulates of, for example, SiC. The CMP process may also be replaced by a chemical polish process based on chemical etching which uses, for example, KOH or ammonia. Furthermore, the CMP process may be replaced by a PACE process based on plasma assisted chemical etching.

Figure 10:
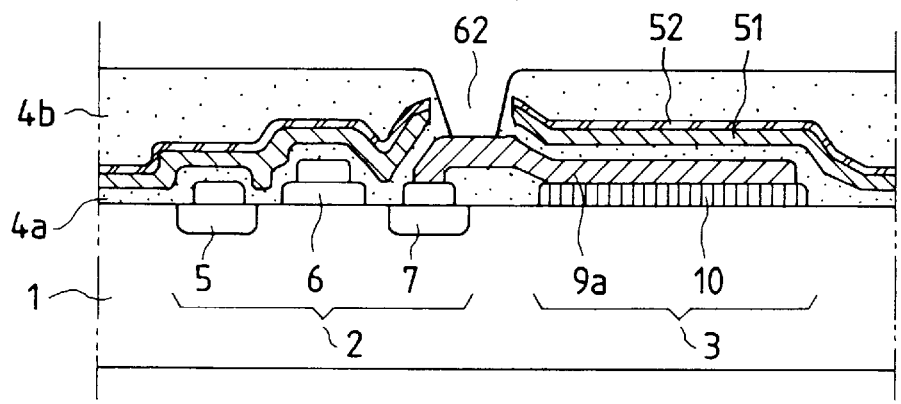

With reference to, FIG. 10, after the polish, the insulating layer 4b was formed with a through hole 62 by a suitable process such as a dry etching process. The through hole 62 concentrically extended into a region corresponding to the recess 61 (see FIG. 7). The through hole 62 had a cross-sectional area slightly smaller than the cross-sectional area of the recess 61. The through hole 62 reached the electrically-conductive portion 9a. Thus, the electrically-conductive portion 9a was exposed at the bottom of the through hole 62.

Figure 11:
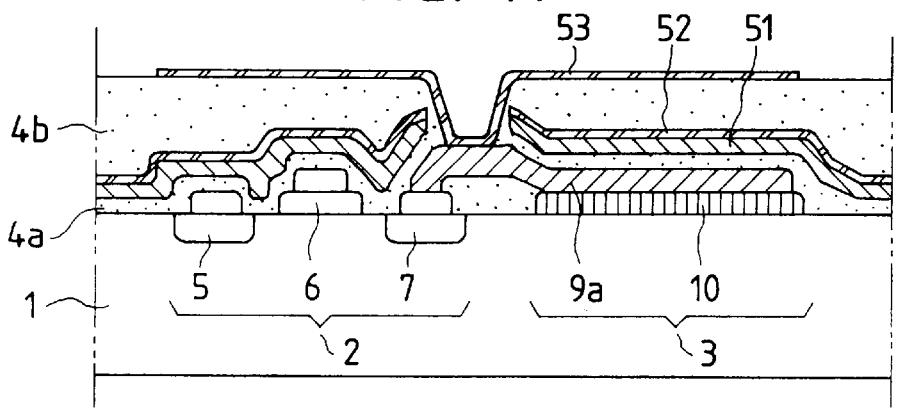
Figure 12:
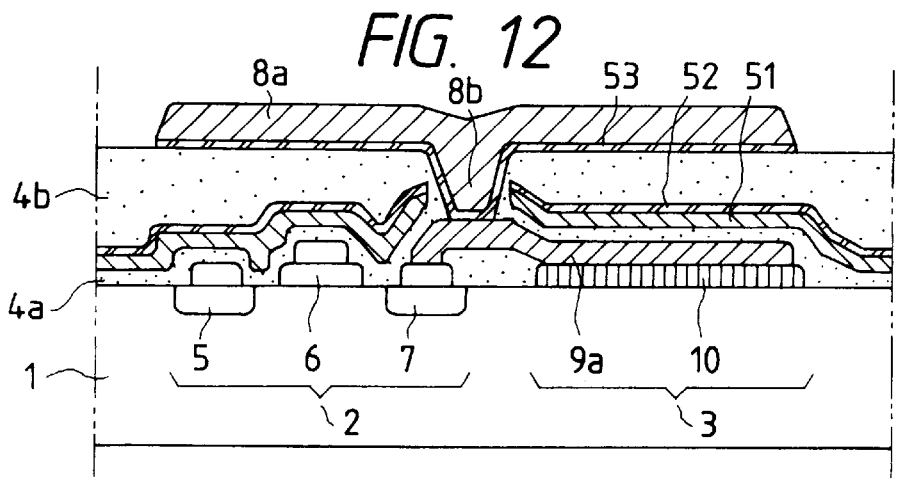

As shown in FIG. 11, an antireflection film 53 made of titanium nitride (TiN) was formed by a sputtering process on exposed upper surfaces (mirror finished surfaces) of the insulating layer 4b, exposed side surfaces of the insulating layer 4b, and exposed upper surfaces of the electrically-conductive portion 9a. The antireflection film 53 had a thickness of about 500 Å. A layer of aluminum (Al) or a layer of Al-based material containing a given small amount of silicon (Si) or copper (Cu) was deposited on the antireflection film 53 by a sputtering process. With reference to FIG. 12, the layer of Al or Al-based material and the antireflection film 53 were made into a reflective electrode layer 8a and a final antireflection film 53 by a dry etching process using a given mask pattern. The reflective electrode layer 8a had a thickness of about 6,000 Å.

Since the upper surfaces of the insulating layer 4b were polished into mirror finished surfaces, upper surfaces of the resultant reflective electrode layer 8a had a high degree of flatness. Specifically, upper surfaces of the reflective electrode layer 8a of Al had a degree of flatness, which corresponded to about 200 Å in central mean roughness. Upper surfaces of the reflective electrode layer 8a of Al-based material containing a given small amount of silicon (Si) or copper (Cu) had a degree of flatness which corresponded to several tens of angstroms to about 100 Å in central mean roughness.

The TiN antireflection film 53 prevents migration between Al atoms in the reflective electrode layer 8a and Si atoms in the insulating layer 4b. Thus, TiN antireflection film 53 prevents the movement of Si atoms from the insulating layer 4b to upper surfaces of the reflective electrode layer 8.

An active circuit element substrate 11 was completed as a result of a sequence of the above-indicated fabrication steps. The side of the active circuit element substrate 11 which had the reflective electrode layer 8a was covered with an orientation film 12 (see FIG. 4).

On the other hand, a transparent substrate 21 (see FIG. 4) was prepared. As shown in FIG. 4, the transparent substrate 21 had a laminate of a glass substrate 22 and a transparent common electrode film 23. The side of the transparent substrate 21 which had the common electrode film 23 was covered with an orientation film 24. The resultant active circuit element substrate 11 and the resultant transparent substrate 21 were combined into a structure in which the orientation films 12 and 24 faced each other. Liquid crystal was placed into a region between the orientation films 12 and 24 to form a liquid-crystal layer 30. As a result, the reflection-type display apparatus of FIG. 4 was completed.

Samples of the reflection-type display apparatus of FIG. 4 were made. In addition, samples of the prior-art reflection-type display apparatus of FIG. 1 were made as comparative examples. Measurement was given of the reflectivity of each of the samples of the reflection-type display apparatus of FIG. 4. Also, measurement was given of the reflectivity of each of the samples of the prior-art reflection-type display apparatus of FIG. 1. The reflectivities of the samples of the reflection-type display apparatus of FIG. 4 were equal to about 80%. On the other hand, the reflectivities of the samples of the prior-art reflection-type display apparatus of FIG. 1 were equal to about 50%.

Figure 13:
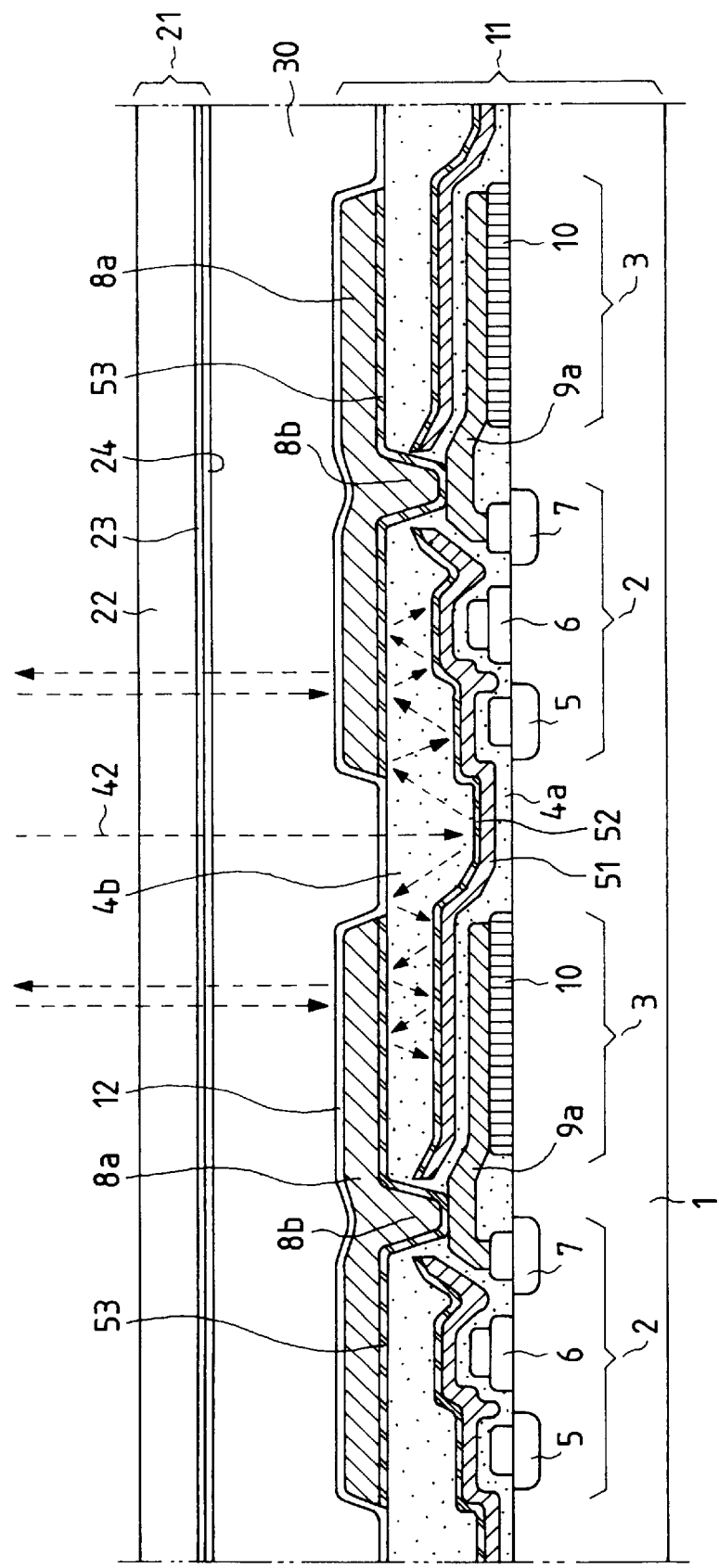
FIG. 13 is a sectional view of a 2-pixel-corresponding portion of the reflection-type display apparatus in the first embodiment of this invention.

FIG. 13 shows two cells of the reflection-type display apparatus of FIG. 4. As shown in FIG. 13, the light shielding layer 51 horizontally extends through regions between the cells or regions between the reflective electrode layers 8a. It is preferable that as viewed from a direction along the travel of forward light, the light shielding layer 51 covers at least areas between the reflective electrode layers 8a. In the case where metal areas of the active circuit elements horizontally project into the areas between the reflective electrode layers 8a, it is preferable that as viewed from a direction along the travel of forward light, the light shielding layer 51 covers at least the areas between the reflective electrode layers 8a except portions occupied by the metal areas of the active circuit elements. As shown in FIG. 13, the light shielding layer 51 blocks forward light 42 which enters the insulating layer 4b via the areas between the reflective electrode layers 8a. Therefore, the forward light 42 which enters the insulating layer 4b via the areas between the reflective electrode layers 8a is prevented from directly reaching the Si substrate 1.

As shown in FIG. 13, the upper surfaces of the light shielding layer 51 are covered with the antireflection film 52. The lower surfaces of the reflective electrode layers 8a are covered with the antireflection film 53. The antireflection films 52 and 53 prevent multiple reflection of light between the upper surfaces of the light shielding layer 51 and the lower surfaces of the reflective electrode layers 8a, thereby blocking the forward light 42 indirectly advancing toward regions below the light shielding layer 51 via areas between edges of the light shielding layer 51 and the projections 8b of the reflective electrode layers 8a. Accordingly, the occurrence of photoconductions in the Si substrate 1 is effectively suppressed.

The light shielding layer 51 is of a monolayer structure. The light shielding layer 51 may be replaced by a plurality of separate light shielding layers. In this case, it is preferable that upper surfaces of the light shielding layers are coated with antireflection films. The light shielding layers may be formed by horizontally extending wiring patterns connected to the electrodes of the MOS-FET's 2, or by horizontally extending the electrically-conductive portions 9a.

With respect to blocking the forward light 42 indirectly advancing toward regions below the light shielding layer 51 while undergoing multiple reflection, it is preferable to provide antireflection films of titanium nitride (TiN) on the electrodes of the MOS-FET's 2 and the electrically-conductive portions 9a, and also on the lower surfaces of the light shielding layer 51.

It should be noted that the liquid-crystal layer 30 may be replaced by a PROM (Pockels readout optical modulator) layer or a PLZT (lead lanthanum zircono-titanate) layer.

Second Embodiment

Figure 14:
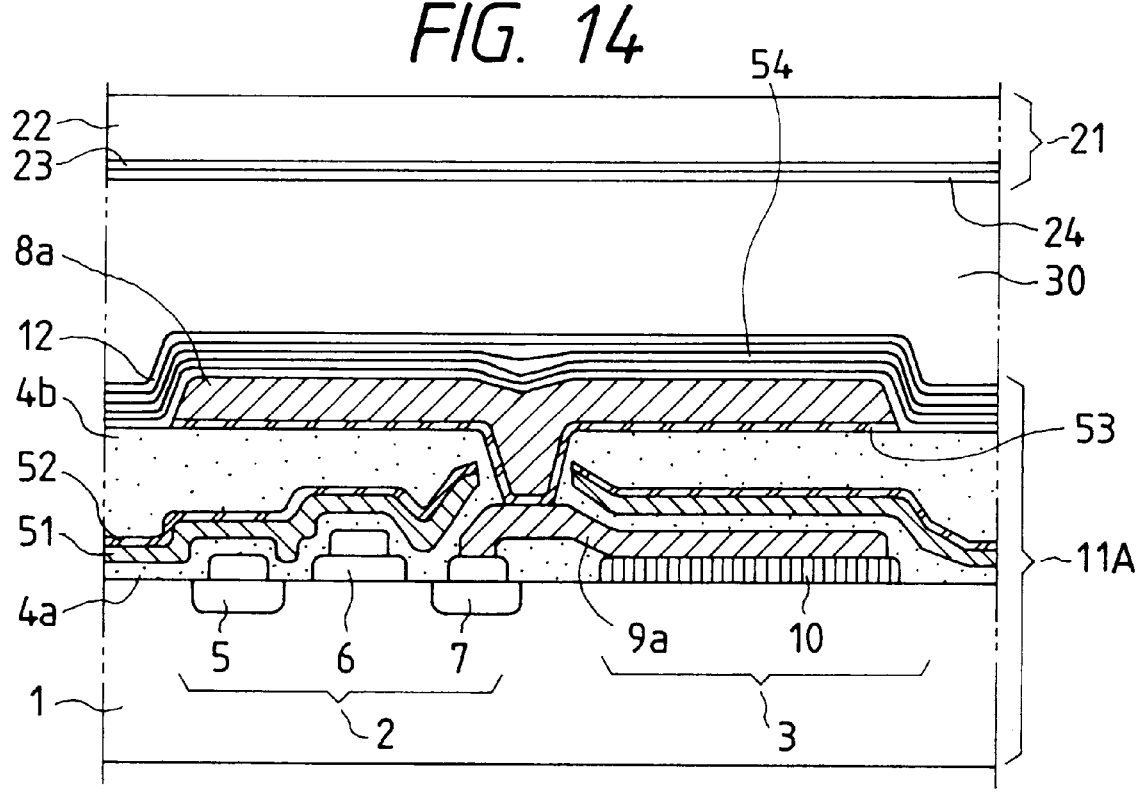
FIG. 14 is a sectional view of a 1-pixel-corresponding portion of a reflection-type display apparatus according to a second embodiment of this invention.

FIG. 14 shows a reflection-type display apparatus according to a second embodiment or this invention. The reflection-type display apparatus of FIG. 14 is similar to the reflection-type display apparatus of FIG. 4 except for a design change explained later.

As shown in FIG. 14, a reflection enhancement layer 54 covers upper surfaces and side surfaces of a reflective electrode layer 8a. The reflection enhancement layer 54 also covers upper surfaces of an insulating layer 4b which are uncovered from the reflective electrode layer 8a. An orientation film 12 is superposed on the reflection enhancement layer 54. The reflection enhancement layer 54 has a laminate of dielectric films. Regarding the reflection enhancement layer 54, it is preferable to alternately laminate $SiO_2$ films and $TiO_2$ films into an 8-layer structure. In this case, it is preferable that the thickness of the $SiO_2$ films and the $TiO_2$ films corresponds to a quarter of the central wavelength of visible light. It is preferable that the reflection enhancement layer 54 has a thickness of about 5,000 Å or less.

Figure 15:
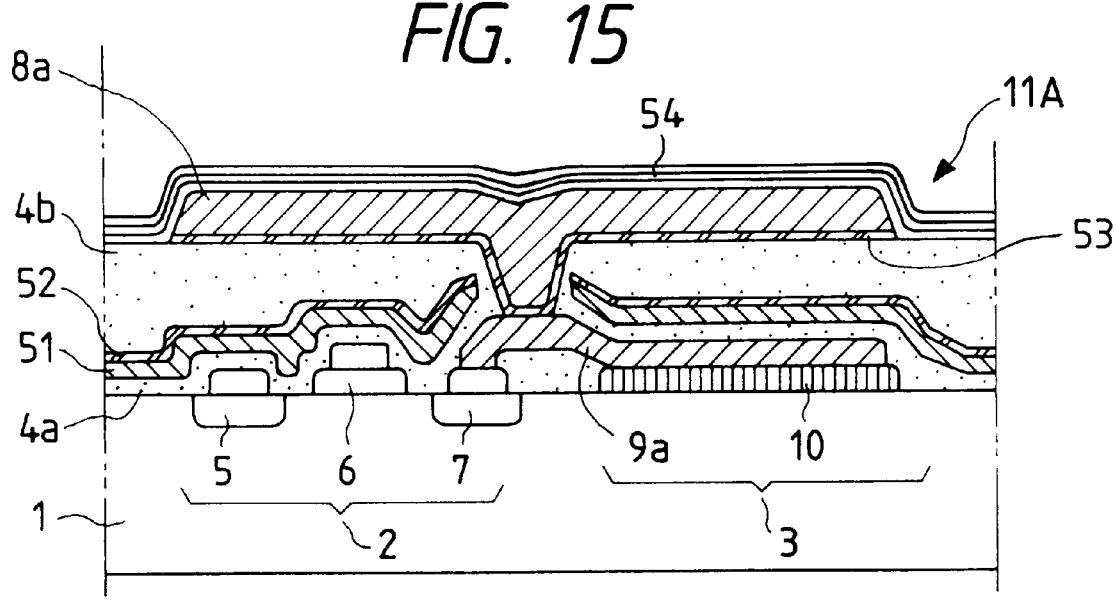
FIG. 15 is a sectional view of a substrate and various regions thereon which occur at a given stage in the fabrication of the reflection-type display apparatus of FIG. 14.

With reference to FIG. 15, during the fabrication of the reflection-type display apparatus of FIG. 14, a reflection enhancement layer 54 was formed after a layer of Al or Al-based material and an antireflection film 53 were made into a reflective electrode layer 8a and a final antireflection film 53 by a dry etching process using a given mask pattern. As a result, an active circuit element substrate 11A was completed. The side of the active circuit element substrate 11A which had the reflective electrode layer 8a was covered with an orientation film 12 (see FIG. 14).

On the other hand, a transparent substrate 21 (see FIG. 14) was prepared. As shown in FIG. 14, the transparent substrate 21 had a laminate of a glass, substrate 22 and a transparent common electrode film 23. The side of the transparent substrate 21 which had the common electrode film 23 was covered with an orientation film 24. The resultant active circuit element substrate 11A and the resultant transparent substrate 21 were combined into a structure in which the orientation films 12 and 24 faced each other. Liquid crystal was placed into a region between the orientation films 12 and 24 to form a liquid-crystal layer 30. As a result, the reflection-type display apparatus of FIG. 14 was completed.

Experiments were carried out to decide a preferable range of the thickness of the reflection enhancement layer 54. First, second, third, and fourth samples of reflection-type display apparatus were made. In the first sample of the reflection-type display apparatus, a reflection enhancement layer was only one laminate set of an $SiO_2$ film and a $TiO_2$ film with a thickness corresponding to a quarter of the central wavelength of visible light. In the second sample of the reflection-type display apparatus, a reflection enhancement layer had a laminate of two sets each having an $SiO_2$ film and a $TiO_2$ film with a thickness corresponding to a quarter of the central wavelength of visible light. In the third sample of the reflection-type display apparatus, a reflection enhancement layer had a laminate of four sets each having an $SiO_2$ film and a $TiO_2$ film with a thickness corresponding to a quarter of the central wavelength of visible light. The fourth sample of the reflection-type display apparatus lacked a reflection enhancement layer. With respect to a range of wavelengths of visible light, measurements were given of the reflection characteristics of the first, second, third, and fourth samples of the reflection-type display apparatus. The results of the measurements revealed that the reflectivity rose in accordance with an increase in the number of sets each having an $SiO_2$, film and a $TiO_2$ film. Also, it was revealed that a wavelength band in which high reflectivities were available narrowed in accordance with an increase in the number of sets each having an $SiO_2$ film and a $TiO_2$ film.

On the other hand, as the thickness of a reflection enhancement layer increases with an increase in the number of sets each having an $SiO_2$ film and a $TiO_2$ film, an electric field applied to a 1-pixel-corresponding area of a liquid crystal layer 30 between a reflective electrode layer 8a and a common electrode film 23 horizontally spreads so that the resolution of a picture represented by return light drops. According to experiments, a resolution of 20 line/mm or higher was available when the thickness of a reflection enhancement layer was equal to or smaller than about 5,000 Å. The resolution dropped from 20 line/mm as the thickness of a reflection enhancement layer increased from about 5,000 Å. For example, the resolution was equal to 14 line/mm when a reflection enhancement layer had a thickness of 1.0 μm. The resolution was equal to 10 line/mm when a reflection enhancement layer had a thickness of 1.5 μm or greater.

According to the results of the experiments, a decided preferable range of the thickness of the reflection enhancement layer 54 extends between a value of about 5,000 Å and a value corresponding to one laminate set of an $SiO_2$ film and a $TiO_2$ film.

Samples of the reflection-type display apparatus of FIG. 14 were made. In addition, samples of the prior-art reflection-type display apparatus of FIG. 1 were made as comparative examples. Measurement was given of the reflectivity of each of the samples of the reflection-type display apparatus of FIG. 14. Also, measurement was given of the reflectivity of each of the samples of the prior-art reflection-type display apparatus of FIG. 1. The reflectivities of the samples of the reflection-type display apparatus of FIG. 14 were equal to about 95%. On the other hand, the reflectivities of the samples of the prior-art reflection-type display apparatus of FIG. 1 were equal to about 50%. Furthermore, measurement was given of the contrast in each of the samples of the reflection-type display apparatus of FIG. 14. Also, measurement was given of the contrast in each of the samples of the prior-art reflection-type display apparatus of FIG. 1. The contrasts in the samples of the reflection-type display apparatus of FIG. 14 were equaL to about 120:1. On the other hand, the contrasts in the samples of the prior-art reflection-type display apparatus of FIG. 1 were equal to about 60:1.

Third Embodiment

Figure 16:
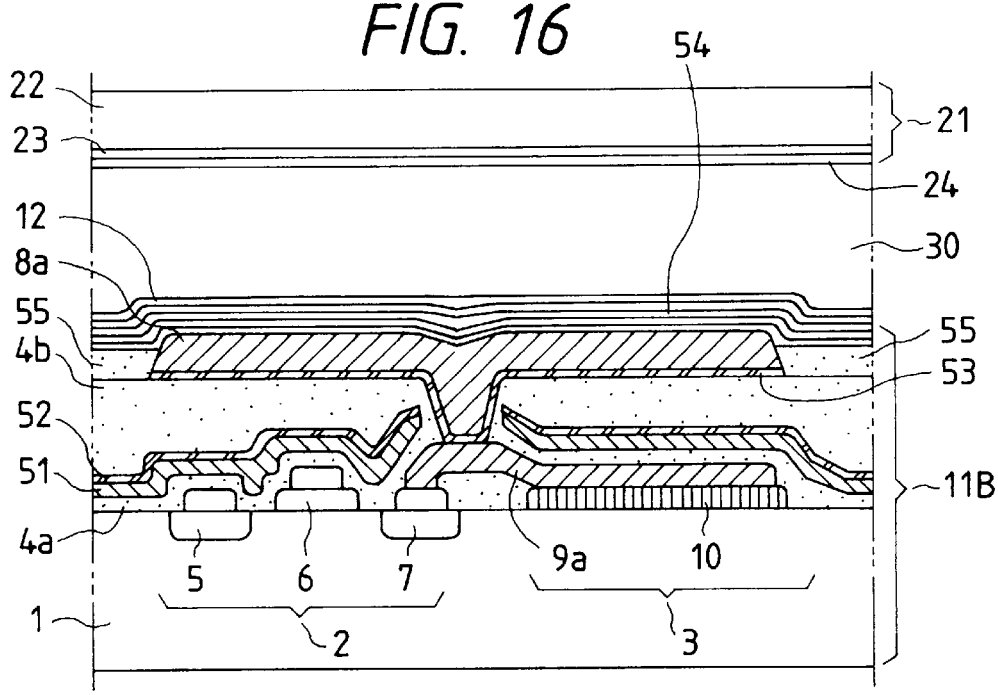
FIG. 16 is a sectional view of a 1-pixel-corresponding portion of a reflection-type display apparatus according to a third embodiment of this invention.

FIG. 16 shows a reflection-type display apparatus according to a third embodiment of this invention. The reflection-type display apparatus of FIG. 16 is similar to the reflection-type display apparatus of FIG. 14 except for a design change explained later.

As shown in FIG. 16, an insulating layer 55 made of, for example, SOG, extends on areas of an insulating layer 4b which are uncovered from a reflective electrode layer 8a. A reflection enhancement layer 54 covers upper surfaces and side surfaces of a reflective electrode layer 8a. The reflection enhancement layer 54 also covers upper surfaces of the insulating layer 55. An orientation film 12 is superimposed on the reflection enhancement layer 54.

The upper surfaces of the reflective electrode layer 8a and the upper surfaces of the insulating layer 55 form a substantially-continuous flat surface corresponding to an optical mirror. This design is effective in suppressing or preventing irregular reflection at the boundary between the reflective electrode layer 8a and the insulating layer 55.

Figure 17:
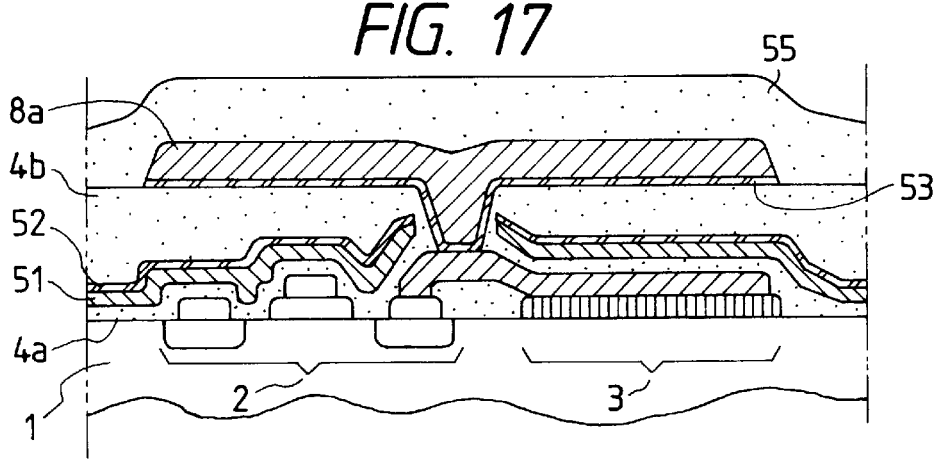
FIGS. 17 and 18 are sectional views of a substrate and various regions thereon which occur at different stages in the fabrication of the reflection-type display apparatus of FIG. 16.
Figure 18:
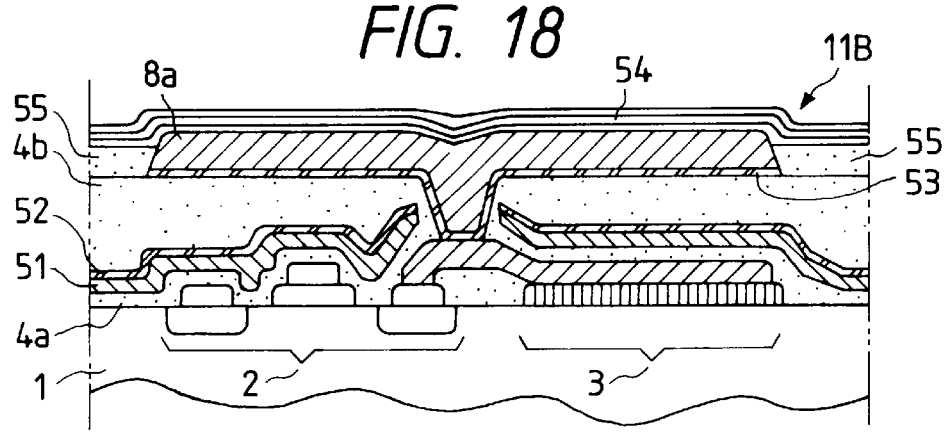

With reference to FIG. 17, during the fabrication of the reflection-type display apparatus-of FIG. 16, a layer 55 of insulating material such as SOG was deposited on exposed surfaces of a reflective electrode layer 8a and an insulating layer 4b after the reflective electrode layer 8a and an antireflection film 53 were formed by a dry etching process using a given mask pattern. Then, upper surfaces of the insulating layer 55 were polished by a suitable process to form mirror finished surfaces. With reference to FIG. 18, polishing the insulating layer 55 was continued until upper surfaces of the reflective electrode layer 8a emerged. It is preferable to completely remove the insulating layer 55 from the upper surfaces of the reflective electrode layer 8a. It is preferable that the upper surfaces of the remaining insulating layer 55 are substantially flush with the upper surfaces of the reflective electrode layer 8a. It is also preferable that the upper surfaces of the remaining insulating layer 55 correspond to mirror finished surfaces capable of preventing irregular reflection. The exposed surfaces of the reflective electrode layer 8a and the insulating layer 55 were coated with a reflection enhancement layer 54. As a result, an active circuit element substrate 11B was completed. The side of the active circuit element substrate 11B which had the reflective electrode layer 8a was covered with an orientation film 12 (see FIG. 16).

On the other hand, a transparent substrate 21 (see FIG. 16) was prepared. As shown in FIG. 16, the transparent substrate 21 had a laminate of a glass substrate 22 and a transparent common electrode film 23. The side of the transparent substrate 21 which had the common electrode film 23 was covered with an orientation film 24. The resultant active circuit element substrate 11B and the resultant transparent substrate 21 were combined into a structure in which the orientation films 12 and 24 faced each other. Liquid crystal was placed into a region between the orientation films 12 and 24 to form a liquid-crystal layer 30. As a result, the reflection-type display apparatus of FIG. 16 was completed.

Samples of the reflection-type display apparatus of FIG. 16 were made. Measurement was given of the reflectivity of each of the samples of the reflection-type display apparatus of FIG. 16. The reflectivities of the samples of the reflection-type display apparatus of FIG. 16 were equal to about 96%. Also, measurement was given of the contrast in each of the samples of the reflection-type display apparatus of FIG. 16. The contrasts in the samples of the reflection-type display apparatus of FIG. 16 were acceptably high.

Fourth Embodiment

Figure 19:
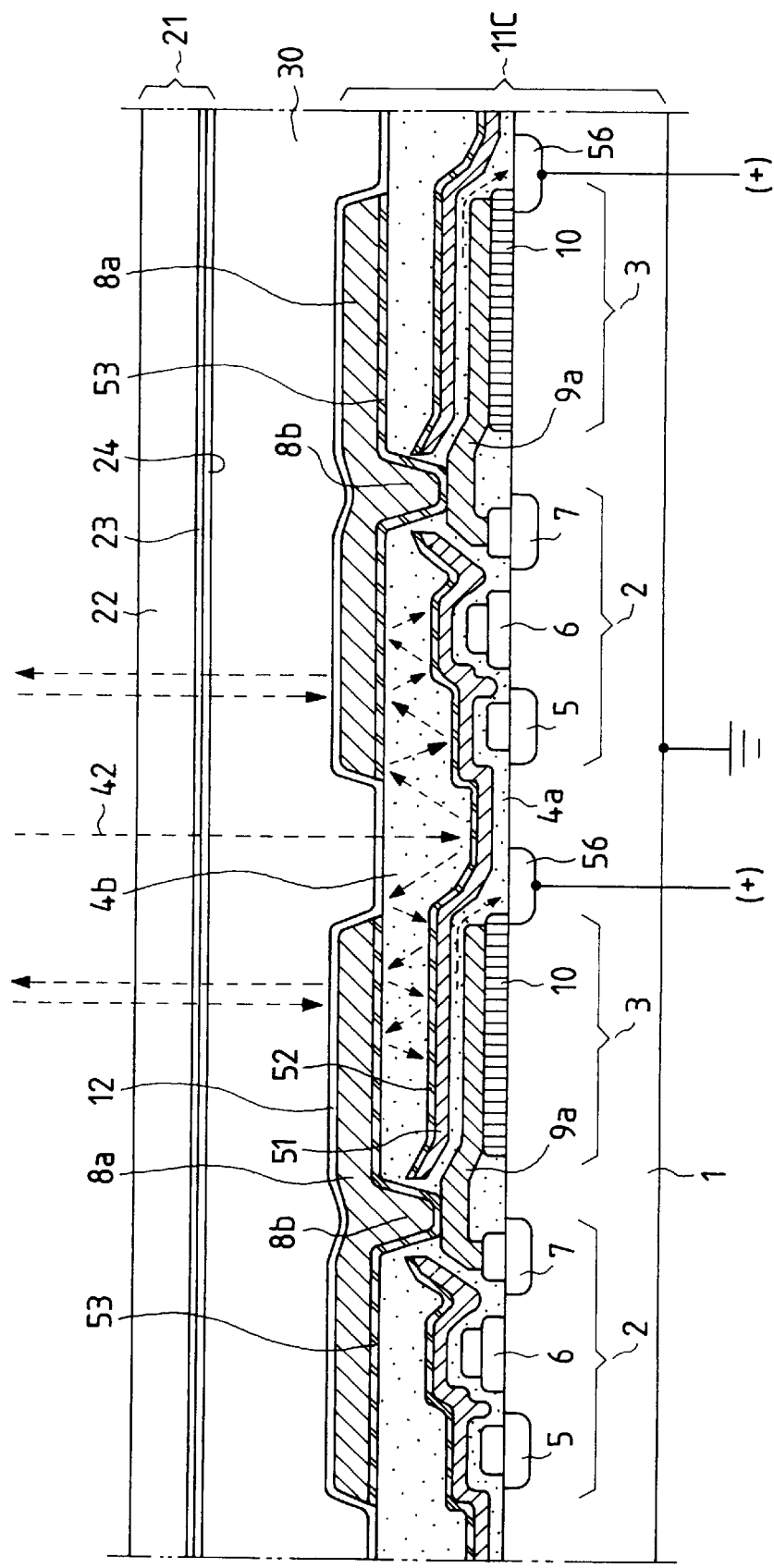
FIG. 19 is a sectional view of a 2-pixel-corresponding portion of a reflection-type display apparatus according to a fourth embodiment of this invention.

FIG. 19 shows a reflection-type display apparatus according to a fourth embodiment of this invention. The reflection-type display apparatus of FIG. 19 is similar to the reflection-type display apparatus of FIGS. 4 and 13 except for design changes explained later.

The reflection-type display apparatus of FIG. 19 includes separating regions 56 formed in portions of an Si substrate 1 which extend between active circuit elements or cells. The separating regions 56 have the conductivity type same as the conductivity type of drains 5 and sources 7 of MOS-FET's 2. The Si substrate 1 has a P-type conductivity. The separating regions 56, and the drains 5 and the sources 7 of the MOS-FET's 2 have N-type conductivities.

In the reflection-type display apparatus of FIG. 19, the Si substrate 1 is subjected to a ground potential. A suitable voltage source (not shown) connected between the Si substrate 1 and the separating regions 56 subjects the separating regions 56 to a given positive potential relative to the ground potential.

It is now assumed that a portion of forward light 42 enters the Si substrate 1 after undergoing multiple reflection and reaching regions below a light shielding layer 51 via areas between edges of the light shielding layer 51 and the projections 8b of reflective electrode layers 8a. In this case, the forward light which enters the Si substrate 1 causes photoconductions, generating pairs of electrons and holes in the Si substrate 1. The generated electrons are immediately absorbed by the separating regions 56. Accordingly, it is possible to prevent the generated electrons from reaching the drains 5 or the sources 7 of the MOS-FET's 2.

The Si substrate 1 may have an N-type conductivity. In this case, the drains 5 and the sources 7 of the MOS-FET's 2, and the separating regions 56 have P-type conductivities. In addition, the separating regions 56 are subjected to a given negative potential relative to the ground potential.

Fifth Embodiment

FIG. 20 shows a reflection-type display apparatus according to a fifth embodiment of this invention. The reflection-type display apparatus of FIG. 20 is similar to the reflection-type display apparatus of FIGS. 4 and 13 except for design changes explained later.

The reflection-type display apparatus of FIG. 20 includes an Si substrate 1 having an N-type conductivity. The Si substrate 1 is formed with separate P-type wells 57. N-channel MOS-FET's 2 are formed on the P-type wells 57 respectively.

In the reflection-type display apparatus of FIG. 20, the wells 57 are subjected to a ground potential. A suitable voltage source (not shown) connected between the Si substrate 1 and the wells 57 subjects the Si substrate 1 to a given positive potential relative to the ground potential.

It is now assumed that a portion of forward light 42 enters the Si substrate 1 after undergoing multiple reflection and reaching regions below a light shielding layer 51 via areas between edges of the light shielding layer 51 and the projections 8b of reflective electrode layers 8a. In this case, the forward light which enters the Si substrate 1 causes photoconductions, generating pairs of electrons and holes in the Si substrate 1. The generated electrons are pulled by the positive potential. In addition, the generated electrons are inhibited by the wells 57 from reaching the drains 5 or the sources 7 of the MOS-FET's 2.

It should be noted that the Si substrate 1 may have a P-type conductivity.

What is claimed is:

1. A reflection-type display apparatus comprising:

an active circuit element substrate;

a matrix array of active circuit elements provided on the active circuit element substrate and each corresponding to one pixel, wherein each of the active circuit elements includes 1) a switching element, 2) a capacitor, 3) an electrically-conductive portion connecting the switching element and the capacitor, 4) an insulating layer covering the switching element, the capacitor, and the electrically-conductive portion, and 5) a reflective electrode layer connected to the electrically-conductive portion and extending on the insulating layer, and wherein the reflective electrode layer extends on the surface of the insulating layer;

a transparent substrate;

a transparent common electrode film extending on a surface of the transparent substrate;

an optical modulation layer located between the reflective electrode layers on the active circuit element substrate and the common electrode film on the transparent substrate;

wherein a voltage difference is generated between each of the reflective electrode layers and the common electrode film in response to a signal applied to a control terminal of the related switching element, and light incident to the transparent substrate is modulated by the optical modulation layer in response to the voltage difference and is reflected by the related reflective electrode layer;

a light shielding layer covering regions between the reflective electrode layers except portions occupied by electrically conductive portions of the active circuit elements as viewed along a direction of incidence of the light for shielding said active circuit element substrate from direct light exposure, the light shielding layer extending on the insulating layer; and antireflection films extending on surfaces of the reflective electrode layers which face the light shielding layer, and an antireflection film extending on a surface of the light shielding layer which faces the reflective electrode layers for preventing multiple reflection of light between the surfaces of the reflective electrode layers and the surface of the light shielding layer and blocking the light indirectly advancing toward said active circuit element substrate to protect said active circuit element substrate from indirect light exposure.

2. A reflection-type display apparatus as recited in claim 1, wherein each of the reflective electrode layers is made of a metal selected from the group consisting of aluminum, aluminum-based material containing silicon, and aluminum-based material containing copper.

3. A reflection-type display apparatus as recited in claim 1, further comprising a reflection enhancement layer extending on the reflective electrode layers, the reflection enhancement layer including a laminate of dielectric films, the reflection enhancement layer including an alternation of silicon oxide films and titanium oxide films, the reflection enhancement layer having a thickness of about 5,000 Å or less.

4. A reflection-type display apparatus as recited in claim 1, further comprising insulating portions filling the regions between the reflective electrode layers, the insulating portions having surfaces which are flat so as to be in agreement with mirror finished surfaces.

5. A reflection-type display apparatus as recited in claim 1, wherein the switching elements include transistors respectively, and further comprising separating regions located between the active circuit elements, the separating regions having a conductivity type equal to a conductivity type of output electrodes of the transistors.

6. A reflection-type display apparatus as recited in claim 1, wherein the active circuit element substrate includes a semiconductor substrate, and the switching elements include transistors on the semiconductor substrate respectively, the semiconductor substrate having wells separate from each other, the wells having a conductivity type opposite to a conductivity type of output electrodes of the transistors, the transistors being provided in the wells respectively.

7. A reflection-type display apparatus as recited in claim 1, wherein the light shielding layer includes a plurality of separate layers.

8. A reflection-type display apparatus as recited in claim 1, wherein the light shielding layer includes a film of aluminum which has a thickness of 3,000 Å, and the antireflection film on the surface of the light shielding layer includes a film of titanium nitride which has a thickness of 1,000 Å, and the antireflection films on the surfaces of the reflective electrode layers include films of titanium nitride which have a thickness of 500 Å.

9. A reflection-type display apparatus comprising:
   a semiconductor substrate;
   an insulating layer provided on the semiconductor substrate;
   first and second reflective electrode layers provided on the insulating layer and being separate from each other;
   a light shielding layer provided on the semiconductor substrate and covering a region between the first and second reflective electrode layers to prevent light from directly entering the semiconductor substrate via the region between the first and second reflective electrode layers; and
   an antireflection film provided on a surface of the light shielding layer which faces the first and second reflective electrode layers, and antireflection films provided on surfaces of the first and second reflective electrode layers which face the light shielding layer for preventing multiple reflection of the light between the surfaces of the first and second reflective electrode layers and the surface of the light shielding layer and blocking the light indirectly advancing toward the semiconductor substrate to protect the semiconductor substrate from indirect light exposure.

10. A reflection-type display apparatus as recited in claim 9, further comprising a reflection enhancement layer extending on the first and second reflective electrode layers, the reflection enhancement layer including a laminate of dielectric films the reflection enhancement layer including an alternation of silicon oxide films and titanium oxide films, the reflection enhancement layer having a thickness of about 5,000 Å or less.

11. A reflection-type display apparatus as recited in claim 9, further comprising an insulating portion provided on the semiconductor substrate and being located at the region between the first and second reflective electrode layers, the insulating portion having a mirror finished surface.

12. A reflection-type display apparatus as recited in claim 9, further comprising a first transistor provided on the semiconductor substrate and being connected to the first reflective electrode layer, the first transistor forming a first cell in conjunction with the first reflective electrode layer, a second transistor provided on the semiconductor substrate and being connected to the second reflective electrode layer, the second transistor forming a second cell in conjunction with the second reflective electrode layer, and a separating region provided in the semiconductor substrate and being located between the first and second cells, the separating region having a conductivity type equal to a conductivity type of output electrodes of the first and second transistors.

13. A reflection type display apparatus as recited in claim 9, further comprising transistors provided on the semiconductor substrate and being connected to the first and second reflective electrode layers respectively, the semiconductor substrate having wells separate from each other, the wells having a conductivity type opposite to a conductivity type of output electrodes of the transistors, the transistors being provided in the wells respectively, the wells being subjected to a ground potential.

14. A reflection-type display apparatus as recited in claim 13, wherein the sells are of a P type, and the transistors provided in the wells comprise N-channel MOS FET's.

15. A reflection-type display apparatus as recited in claim 9, wherein the light shielding layer includes a film of aluminum which has a thickness of 3,000 Å, and the antireflection film on the surface of the light shielding layer includes a film of titanium nitride which has a thickness of 1,000 Å, and the antireflection films on the surfaces of the reflective electrode layers include films of titanium nitride which have a thickness of 500 Å.

* * * * *